3,846,306
BONDING OF ENZYMES, ENZYME DERIVATIVES AND OTHER BIOLOGICALLY ACTIVE MOLECULES TO POLYMERIC MATERIALS
Sidney Alan Barker and Charles John Gray, Birmingham, England, assignors to Koch-Light Laboratories Limited, Buckinghamshire, England
No Drawing. Filed Dec. 10, 1971, Ser. No. 206,855
Claims priority, application Great Britain, Dec. 11, 1970, 59,145/70
Int. Cl. B01d 15/08; C07g 7/02
U.S. Cl. 210—198 C                    13 Claims

ABSTRACT OF THE DISCLOSURE

This invention discloses polymeric materials having thiol or thiolactone groups to which biologically active molecules have been bonded to render them insoluble. When the biologically active molecules attached to the polymers are enzyme molecules or enzyme derivatives they are particularly suitable for catalysing reactions effected in aqueous solutions, the insoluble polymeric materials being filtered off from the product and if required re-used.

---

This invention relates to the bonding of biologically active molecules such as, for example, enzymes, enzyme derivatives and proteins to polymeric materials and is particularly concerned with polymeric materials to which biologically active molecules have been bonded to render them water-insoluble and to certain polymeric materials to which biologically active molecules such as, for example, enzymes and enzyme derivatives can be bonded.

BACKGROUND OF THE INVENTION

Enzymes are normally soluble in water and when they are used to catalyse reactions occurring in aqueous solutions, their recovery is often difficult and expensive and may not be an economic proposition. In some cases it may be necessary to remove the enzyme from the product and even its destructive separation may be a tedious procedure.

This is particularly important in the biochemical field where the recovery of metabolic intermediates, the protein enzymes that catalyse their conversion, and the hormones which often control a sequence of reactions is of major importance. There is also an increasing usage of protein antibodies in an insolubilised form in radioimmunoassays for clinical diagnosis.

The enzyme molecules can be covalently bonded to a water insoluble polymer so that the enzyme can then be filtered off from an aqueous reaction medium and reused if desired. Care must be taken, however, to ensure that this covalent bonding does not destroy or deleteriously modify the catalytic activity of the enzyme.

For best results, the water-insoluble polymer should have an overall hydrophilic nature. Also, for convenience, the enzyme molecules should be capable of bonding directly to groupings on the polymer chain without activation of those groupings immediately prior to bonding. Further, it would be an advantage in many instances for the polymer to be such that, when the bound enzyme has become denatured, fresh or different enzyme can be bonded to the polymer in its place.

The invention, has therefore, been made with these points in mind.

THE INVENTION

According to the invention there is provided a hydrophilic water-insoluble polymer having along its molecular chains repeating thiol and/or thiolactone side groupings to which biologically active molecules are attached, the polymer with attached biologically active molecules being water insoluble.

When the biologically active molecules in such materials are enzyme molecules or their derivatives they make excellent catalysts and are particularly useful for catalysing reactions effected in aqueous solutions since the insoluble materials can be simply filtered off from the product and if required reused.

Additionally, the biologically active molecules can be bonded directly to the thiol and/or thiolactone groupings without any activation immediately prior to bonding and the resultant covalent links hold the biologically active molecules to the polymer. In the case where the biologically active molecule is attached to the polymer through a disulphide group it is possible to remove the biologically active molecules from the polymers once they have become denatured by treatment with a thiol containing agent. If it is desired to attach different biologically active molecules to the polymer for example, then fresh biologically active molecules can be bonded to the resulting free thiol side groupings.

By following the invention one can covalently bond to the hydrophilic water-insoluble polymer biologically active molecules such as proteins and enzymes such that, when the polymer has thiol side groupings the functional groups with which it can be induced to react are other thiol groups and disulphide groups, and when the polymer has thiolactone side groupings, the functional groups with which it can be induced to react are hydroxyl groups, phenolic groups and amino groups.

The polymer preferably has other repeating functional side groupings than the thiol or thiolactone groupings, these functional side groupings serving to make the polymer hydrophilic.

We have also found, according to another aspect of the invention, that one suitable group of polymers are those water-insoluble hydrophilic polymers with molecular chains having repeating thiol and/or thiolactone side groupings to which biologically active molecules can be attached, the molecular chains also having other repeating functional side groupings which make the polymer hydrophilic including primary amide groups and other groupings, e.g. carboxylic acid groups.

With polymers containing thiol side groupings according to the invention the chemical bond between the biologically active molecule and the carrier polymer can be cleaved without destruction of the carrier. When the biologically active molecules are enzymes they can therefore be regenerated when the enzyme activity is exhausted or if the enzyme is to be resolubilised. Therefore this allows a more economic use of the polymer carrier.

When attaching enzymes or other biologically active molecules to polymeric carriers the site of attachment in the enzyme or biologically active molecule is of vital importance for the display of maximum catalytic activity or biological activity. The polymers according to the invention permit a range of sites in any given enzyme or enzyme derivative or biologically active molecule to be investigated. The polythiol is effective for attachment via reaction with —SH and —S—S groups, and the polythiolactone with hydroxyl groups, phenolic groups and amino groups.

The primary amide side groupings can be derived from acrylamide. The cross linking can be achieved with N,N'-methylene-bis-acrylamide linking units or other linking units. Repeating carboxylic acid and thiol groupings can be present as N-substituted cysteine residues derived from N-acryloyl S-benzyl-cysteine after polymerization, for example, by treatment with sodium in liquid ammonia or by the more economic use of N-acryloyl thiazolidine carboxylic acid in the polymerisation followed by treatment with hydrochloric acid.

The carboxylic acid groups can be present in the form of their N-ethylamide derivatives and such polymers may be prepared by the use of N-acryloyl S-benzyl cysteine N-ethylamide in the polymerisation and subsequent removal of the S-benzyl groups with sodium in liquid ammonia. The carboxylic acid containing polymers may be converted to the thiolactone derivatives using dicyclohexylcarbodiimide in an anhydrous solvent.

These polymers according to this invention, can readily have biologically active molecules such as, for example, enzyme molecules, their derivatives or organic molecules with similar functional groups, coupled to their thiol or thiolactone groupings and the resulting polymer/organic molecule or enzyme conjugates are insoluble in water. Disulphide derivatives of the polythiol can also be used in exchange reactions with thiol derivatives of enzymes or organic molecules containing thiol groups to insolubilise them. A proportion of the enzyme molecules coupled to the polymers retain their biological activity and can still be used as specific catalysts. Antibodies coupled to the polymers retain much of their specific interaction with antigens and can be used in radioimmunoassays. When enzyme catalysis is complete or the attached organic molecule such as an antibody is to be removed, then this can be easily performed in those cases cited above where the attachment is via a disulphide bond merely by treatment with an excess of a suitable thiol containing agent such as cysteine hydrochloride or mercaptoethanol. The particulate polymer/biologically active molecule or enzyme conjugate can be used as the active fill of a column through which a solution of molecules with which it is required to interact is perfused, or, alternatively, maintained suspended in dynamic equilibrium by an upward flow of the solution in a fluidised bed reactor.

As well as being prepared in particulate form, the polymers of this invention may be synthesised in the form of sheets, coatings and also impregnated within the pores of various support materials.

An important advantage of this invention is that the thiol and disulphide containing polymers may have organic molecules coupled to them and these organic molecules whether they are enzymes, enzyme derivatives, hormones, proteins or peptides linked via the disulphide link to the polymers, can be recovered in such a way that the carrier polymer is available for coupling of fresh batches of organic molecules of this type.

A second advantage is that the water-insolubilised enzymes often have improved stability over the native enzyme in solution. A third advantage lies in the simplicity of the procedure by which the biologically active molecule may be attached.

Chemical coupling of biologically active molecules can be achieved by dissolution in aqueous buffer, adding the polymer, and allowing the resultant reaction to proceed over some hours with stirring. Alternatively, the same coupling can be achieved by passage of the biologically active molecules in aqueous buffer through a column packed with the polymer or a fluidised bed of the polymer particles. This is also the preferred method of removing the biologically active molecules attached to the polymer in those cases where this is feasible with a thiol containing compound linked via a disulphide bond. In all cases there may be an optimum pH for achieving maximum retention of the biologically active molecules which is a compromise between the optimum pH for coupling via the particular linkage used and the pH maximum stability of the free and bound organic species being recovered. In general this optimum pH is slightly alkaline for the polythiol used as a disulphide derivative and oxygen is preferably excluded during the reaction process.

An exception to the above processes of coupling is adopted where the biologically active molecules being recovered contain thiol groups either in its native condition or after reaction with homocysteinethiolactone. Here the coupling can be achieved by oxidising the polymeric thiol and the thiol containing biologically active molecules together to effect disulphide bridging between the two molecules. A suitable reaction medium for this is an aqueous alkaline buffer of pH 10.6 containing oxygen, air or potassium ferricyanide.

Copolymers of N-acryloyl S-benzylcysteine and N,N'-methylene-bis-acrylamide can be prepared in which the ratio of the two monomers is infinitely variable by dissolving the monomers in aqueous solution and adding a catalyst such as ammonium persulphate. Thiol groups can be generated by treatment with sodium in liquid ammonia or other suitable reagent. In most circumstances incorporation of acrylamide in the polymer is desirable to effect a reduction in the overall cost.

Copolymers of N,α - acryloyl-N'-ethyl-S-benzylcysteine amide and N,N'-methylenebisacrylamide, with or without the addition of acrylamide and in which the ratio of the first two monomers is infinitely variable, can be prepared in a similar manner. Thiol groups can be generated by treatment with sodium in liquid ammonia or other suitable reagent.

Copolymers of N - acryloylthiazolidinecarboxylic acid and N,N' methylene bisacrylamide can be prepared in which the ratio of the first two monomers is infinitely variable by dissolving the monomers in aqueous solution and adding a catalyst such as ammonium persulphate. Thiols groups can be generated by treatment with hydrochloric acid or other suitable hydrolysing reagents in certain circumstances incorporation of acrylamide in the polymer may be desirable since this leads to a reduction in the overall cost.

N-Acryloylthiazolidine 4 - carboxylic acid can be prepared by mixing acryloyl chloride with an aqueous solution of thiazolidine carboxylic acid made alkaline by a suitable reagent such as sodium carbonate. S-Benzyl-N-acryloyl cysteine can be made by mixing acryloyl chloride with an aqueous solution of S-benzylcysteine made alkaline by a suitable reagent such as sodium hydroxide.

Conversion of S-benzyl-N-acryloylcysteine to N-acryloyl N'-ethyl-S-benzyl cysteine amide can be effected by mixing ethylamine and S - benzyl N-acryloyl-cysteine in dry dimethylformamide at 0° C. and subsequent addition of dicyclohexylcarbodiimide.

Another useful method for preparing the water-insoluble hydrophilic polythiols or polythiolactones according to the invention involves acetamide alkyl blocking groups, e.g. acetamidomethyl blocking groups, and their eventual removal with a mercury compound to leave the thiol groups. One particular polymer which can be prepared by this method is the copolymer of N-acryloyl-S-acetamidomethyl cysteine hydrochloride, bis-acrylamide and acrylamide. The monomers are dissolved in an aqueous solution containing a catalyst and an acid such as hydrochloric acid. To remove the acetamidomethyl blocking groups the copolymer is suspended in a solution of mercuric acetate in water, excess mercuric acetate being removed and the copolymer washed with cysteine-hydrochloric solution.

Therefore according to another aspect of the invention there is provided a hydrophilic water-insoluble polymer with molecular chains having repeating thiol and/or thiolactone side groupings to which biologically active molecules can be attached to give a combined hydrophilic water-insoluble polymer and biologically active molecule, the molecular chains also having other repeating functional side groups which make the polymer hydrophilic the said other repeating functional side groupings including primary amide groups.

N - Acryloyl-S-acetamidomethyl-cysteine hydrochloride can be prepared by treating acetamide with a solution of sodium hydroxide in formaldehyde and then treating the resulting acetamidomethanol with an acid solution of L-cysteine hydrochloride monohydrate to form S-acetamidomethyl-L-cysteine hydrochloride. An alkaline solution of this is then treated with acryloyl chloride to form the N-acryloyl-S-acetamidomethyl-cysteine.

All the thiol-carboxylic acid containing copolymers mentioned above can be converted to the corresponding thiolactones by suspension in dioxan and subsequent addition of dicyclohexylcarbodiimide.

Sheets and coatings of the above copolymers may be obtained by applying the monomers either above or in solution to a suitable surface, for example, glass and polymerising by addition of a catalyst.

Impregnation of the copolymers within a porous support such as filter paper can be achieved by dipping papers impregnated with ammonium persulphate into an aqueous solution of the appropriate monomers.

One particular use of the invention is in the recovery of organic species using a chromatographic column of the water insoluble hydrophilic polythiol soaked in an alkali buffer. Examples of some of the reactions between organic species and the water-insoluble hydrophilic polythiol or polythiolactone are given below. Therefore according to another aspect of the invention we provide a chromatographic column the fill of which is a water-insoluble hydrophilic polythiol.

PREFERRED EMBODIMENTS OF THE INVENTION

The invention will now be illustrated with reference to the following examples.

EXAMPLE 1

Preparation of a Water-Insoluble Hydrophilic Polythiol (Copolymer B)

S - Benzyl-N-acryloylcysteine from S-benzyl cysteine.—Acryloyl chloride (5.12 g.) was added dropwise to a cooled, stirred solution of S-benzylcysteine (10.0 g.) in sodium hydroxide solution (1N, 96 cm.$^3$). The reaction mixture was stirred at 0° C. for 4 hours; then it was filtered and the filtrate extracted with benzene (4×10 cm.$^3$). The aqueous layer was cooled to 0° C. and adjusted to pH 5.0 with cooled 1N hydrochloric acid, whereupon the unreacted S-benzylcysteine precipitated (0.587 g.). This was filtered off, and the filtrate was adjusted to pH 2.0 with 1N hydrochloric acid at 0° C. The mixture was then extracted with ethyl acetate (5×50 cm.$^3$). The ethyl acetate layers were washed with sodium carbonate solution to neutrality and then with water (4×20 cm.$^3$), dried (Na$_2$SO$_4$) and evaporated leaving an oil (10.2 g.), $[\alpha]_D^{23}$ —57° (C=0.5 MeOH). T.L.C. single ninhydrin negative, chlorine positive spot RF 0.8 (solvent B). The infrared spectrum (liquid film) showed bands at 3300, 1720, 1600, 1420, 1290, 985 and 718 cm.$^{-1}$. The product crystallised on being treated with aqueous ethanol. The solid product had m.p. 77–79° $[\alpha]_D^{23}$ —57.5° (C=5.0, MeOH). The infrared spectrum (nujol) showed bands at 3340, 1720, 1600, 1290, 985 and 710 cm.$^{-1}$. Paper chromatography: single ninhydrin negative, chlorine positive spot RF 0.88 (solvent B). A sample for analysis was recrystallised from ethyl acetate, m.p. 77–79° C.

Analysis.—Found: C, 58.4%; H, 5.8%; N, 5.6%; S, 12.4%. C$_{13}$H$_{15}$NO$_3$S requires: C, 58.8%; H, 5.7%; N, 5.3%; S, 12.1%.

Copolymer of Acrylamide and N-Acryloyl-S-Benzylcysteine (Copolymer A)

Stock solutions A and B were prepared.—Solution A: 2-amino - 2 - (hydroxymethyl)propane-1,3-diol (36.6 g.) and N,N,N$^1$,N$^1$-tetramethylethylenediamine (0.46 cm.$^3$ in 1N hydrochloric acid, 45 cm.$^3$), were mixed and diluted to 100 cm.$^3$ with water. Solution B: Acrylamide (28 g.) and N,N$^1$-methylenebisacrylamide (0.735 g.) were mixed and dissolved in water (100 cm.$^3$).

S-Benzyl - N - acrylocylcysteine (3.0 g.) was dissolved in solution A (10 cm.$^3$). N,N$^1$-Methylenebisacrylamide (1.0 g.) was dissolved in solution B (20 cm.$^3$). Then the two solutions were mixed together and ammonium persulphate solution was added (0.140 g. in 100 cm.$^3$, 40 cm.$^3$). The solution was left to stand at room temperature, and after thirty minutes set to a gel. After a further 12 hours the gel was broken up in a top drive macerator and washed with water. Then it was centrifuged down. The washing process using the macerator was repeated with water (3×150 cm.$^3$), then with ethanol (3×150 cm.$^3$). The solid was then filtered off and washed with ethanol (300 cm.$^3$) using a vacuum filter, and dried in a desiccator over P$_2$O$_5$. The dried product was a white powder (7.8 g.). The infrared spectrum (KBr) showed bands at 3430, 3220, 1720, 1640 and 700 cm.$^{-1}$.

Found: C, 44.2%; H, 6.4%; N, 15.1%; S, 2.2%.

Reduction of Copolymer A

Liquid ammonia (10 cm.$^3$; dried by distillation from sodium metal) was added with stirring to copolymer A (1.0 g.). Initially, after the addition of sodium metal in small pieces to this mixture, the blue colour which was produced rapidly disappeared. After the addition of about 60 mg. the blue colour remained for 20 minutes. Then anhydrous ammonium acetate (2 g.) was added. The ammonia was allowed to evaporate off at room temperature. Then 1N hydrochloric acid (10 cm.$^3$) was added to the residue. The solid was filtered off and washed with oxygen-free water (100 cm.$^3$), cysteine hydrochloride solution (0.1M, 100 cm.$^3$), oxygen-free water (100 cm.$^3$) and with ethanol (300 cm.$^3$) and then dried under vacuum in a dessicator over P$_2$O$_5$. The dried product (Copolymer B according to the invention) was a white powder (0.832 g.). The infrared spectrum (KBr) showed bands at 3430, 3200, 1640, 1730 and 2580 cm.$^{-1}$.

Found: C, 48.9%; H, 6.5%; N, 16.8%; S, 4.2%.

EXAMPLE 2

Chromatography of Insulin on a Column of Copolymer B

Copolymer B (600 mg.) was soaked in 0.1 M sterilised oxygen-free phosphate buffer pH 8.0 (buffer A). Then insulin (6.0 mg. in Buffer A, 0.4 cm.$^3$) was applied to a column of this copolymer (1×6 cm.) and washed on with Buffer A (0:6 cm.$^3$). The column was eluted with Buffer A (80 cm.$^3$). Gradient elution of the column was then achieved using two solutions:

Buffer A (45 cm.$^3$) and cysteine hydrochloride (300 mg. in Buffer A 45 cm.$^3$) where the concentration of cysteine hydrochloride was increased gradually. Fractions (1 cm.$^3$) were collected and scanned at 280 nm. Fractions corresponding to each peak were combined and called Peak I, Peak II and Peak III respectively. Peak II was freeze dried and treated with formic acid (99%, 1.0 cm.$^3$) and hydrogen peroxide (0.1 cm.$^3$, 30%). The reaction mixture was left at room temperature for 40 minutes then water (2 cm.$^3$) was added. The solution was then lyophilised. To the residue was added an aliquot of a solution containing nor-leucine (0.1 $\mu$ mole) as an internal standard and then the solution was made up to 5.9 N HCl. The solution was frozen in a tube which was sealed under vacuum and heated at 108° for 24 hours. The hydrolyzate was then evaporated to dryness, and the residue dissolved in distilled water for analysis. The same procedures were repeated with Peak III. The results of the amino acid analyses were shown in Table I.

TABLE 1

Amino Acid Analysis of Insulin, Peak II and Peak III

| Amino acid | Insulin | Theoretical | | | Peak | | | |
|---|---|---|---|---|---|---|---|---|
| | | Insulin | Chain A | Chain B | II | | III | |
| Aspartic acid | 2.93 | 3 | 2 | 1 | 2.85 | (3) | 2.91 | (3) |
| Threonine | 1.00 | 1 | 0 | 1 | 1.00 | (1) | 1.00 | (1) |
| Serine | 2.92 | 3 | 2 | 1 | 2.94 | (3) | 2.81 | (3) |
| Glutamic acid | 7.20 | 7 | 4 | 3 | 7.40 | (7) | 7.50 | (7) |
| Proline | 0.67 | 1 | 0 | 1 | 0.36 | (1) | 0.38 | (1) |
| Glycine | 4.10 | 4 | 1 | 3 | 4.22 | (4) | 4.13 | (4) |
| Alanine | 3.11 | 3 | 1 | 2 | 2.91 | (3) | 2.95 | (3) |
| Valine | 4.92 | 5 | 2 | 3 | 4.68 | (5) | 4.72 | (5) |
| Cysteine | 6.10 | 6 | 4 | 2 | | | | |
| Methionine | 0 | 0 | 0 | 0 | | | | |
| Isoleucine | 0.61 | 1 | 1 | 0 | 0.6 | (1) | 0.55 | (1) |
| Leucine | 5.93 | 6 | 2 | 4 | 5.46 | (6) | 5.30 | (6) |
| Tyrosine | 4.10 | 4 | 2 | 2 | 4.30 | (4) | 4.21 | (4) |
| Phenylalanine | 3.22 | 3 | 0 | 3 | 3.30 | (3) | 3.24 | (3) |
| Lysine | 1.10 | 1 | 0 | 1 | 1.10 | (1) | 1.10 | (1) |
| Histidine | 2.10 | 2 | 0 | 2 | 2.40 | (2) | 2.32 | (2) |
| Arginine | 1.00 | 1 | 0 | 1 | 1.00 | (1) | 1.00 | (1) |

EXAMPLE 3

Preparation of a Water Insoluble Hydrophilic Polythiol (Copolymer E)

N-Acryoyl-N'-ethyl - S - benzylcysteine Amide.—Ethylamine (0.58 cm.$^3$) was added to a cooled (0° C.) solution of S-benzyl-N-acryloylcysteine (3.0 g.) in dry dimethylformamide (8 cm.$^3$). The mixture was stirred at 0° C. for 5 minutes, then dicyclohexylcarbodiimide (2.34 g.) was added slowly. The reaction mixture was stirred at 4° C. for 16 hours; then it was filtered. The filtrate was evaporated at 40° C. under reduced pressure. The residue was dissolved in ethyl acetate (20 cm.$^3$), undissolved material was filtered off. The filtrate was washed with sodium carbonate solution (1N, 4×20 cm.$^3$) and with water (4×20 cm.$^3$), dried (Na$_2$SO$_4$) and evaporated leaving a white solid (2.95 g.), m.p. 140–143° C., $[\alpha]_D^{22}$ −31.4° (C=0.5, tetrahydrofuran). T.L.C. single chlorine positive, minhydrin negative spot RF 0.57 (solvent B). The infrared spectrum showed bands at 3350, 1680, 1610, 3010, 3030, 990 and 700 cm.$^{-1}$. Recrystallisation was achieved from ethyl acetate, m.p. 140–142° C., $[\alpha]_D^{22}$ −31.4° (C=0.5, tetrahydrofuran).

*Analysis.*—Found: C, 61.2; H, 6.6; N, 9.6; S, 10.9. C$_{15}$H$_{20}$N$_2$SO$_2$ requires C, 61.6; H, 6.8; N, 9.6; S, 10.9%.

Copolymer of acrylamide and N-acryloyl-N'-ethyl-S-benzylcysteine Amide (Copolymer D)

N,α-Acryloyl-N'-ethyl-S-benzylcysteine amide (1.0 g.) was dissolved in solution A (4 cm.$^3$). N-N'-Methylenebisacrylamide (0.393 g.) was dissolved in solution B (8 cm.$^3$). Then the two solutions were mixed together and ammonium persulphate solution, was added (20 cm.$^3$, 0.140 g. in 100 cm.$^3$ of water). The mixture was allowed to stand at room temperature for 24 hours, a gel was formed. The gel was broken up in a top drive macerator, and washed with water. Then it was centrifuged down. The washing process using the macerator was repeated with water (3×50 cm.$^3$) then with ethanol (3×50 cm.$^3$). The solid was then filtered off and washed with ethanol (100 cm.$^3$) using a vacuum filter and dried in a desiccator over P$_2$O$_5$. The dried product was a white powder (3.2 g.). The infrared spectrum (Nujol) showed bands at 3350, 3200, 1680, 1660, 1540 and 720 cm.$^{-1}$.

Reduction of Copolymer D (Copolymer E)

Liquid ammonia (about 18 cm.$^3$, dried by distillation from sodium metal) was added with stirring to copolymer D (2.0 g.). Initially after the addition of sodium metal in small pieces to this mixture, the blue colour which was produced rapidly disappeared. After the addition of about 150 mg., the blue colour remained for 30 minutes. Then anhydrous ammonium acetate (3 g.) was added. The ammonia was allowed to evaporate off at room temperature. Then 1N hydrochloric acid (15 cm.$^3$) was added to the residue. The solid was filtered off and washed with oxygen-free water (200 cm.$^3$), cysteine hydrochloride solution (0.1 M, 100 cm.$^3$), oxygen-free water (200 cm.$^3$) and with ethanol (300 cm.$^3$) and then dried under vacuum in a desiccator over P$_2$O$_5$. The dried product was a white powder, Copolymer E according to the invention (1.79 g.).

The infrared spectrum (KBr) showed bands at 3340, 3200, 1680, 1650 and 2587 cm.$^{-1}$.

EXAMPLE 4

The Reaction of Trypsin with Copolymer B

1. Conversion of the enzyme trypsin to trypsin-poly SH.—N-Acetylhomocysteine thiolactone (10 mg. in carbonate buffer pH 10.6, 0.5 cm.$^3$) was added to a solution of trypsin (100 mg. in carbonate buffer pH 10.6, 10 cm.$^3$). The mixture was allowed to stand at 4° C. for 60 minutes and then it was immediately passed through a column of Sephadex G 25 (2×50 cm.). The column was then eluted with carbonate buffer pH 10.6. Fractions (1 cm.$^3$) were collected and scanned at 280 nm. Fractions representing the protein were combined and made up to 100 cm.$^3$ with carbonate buffer pH 10.6 (this solution was called trypsin SH I).

Trypsin SH I (5.0 cm.$^3$) was diluted to 100 cm.$^3$ with carbonate buffer pH 10.6 (this solution was called trypsin SH II).

2. The Reaction of Trypsin SH I with Copolymer B.—Cross-linking solution (1 cm.$^3$) was added to a stirred suspension of Copolymer B (50 mg.) in Trypsin SH I (20 cm.$^3$). The suspension was stirred for 16 hours at 4° C., then it was centrifuged and the solid washed with carbonate buffer pH 10.6 (7×3 m.$^3$). The supernatants and the washings were combined and made up to 100 cm.$^3$ with the same buffer (this solution was called Trypsin SH III).

The solid was then washed with 0.1 M cysteine hydrochloride (3×2 cm.$^3$) using a centrifuged. The supernatants were combined and made up to 10.0 cm.$^3$ with 0.05 M phosphate buffer pH 7.6. This solution was supplied immediately to a column of Sephadox G 25 (1×45 cm.). The column was eluted with 0.05 M phosphate buffer pH 7.6. Fractions (1 cm.$^3$) were collected and scanned at 280 nm. The profile showed two peaks, the first one representing the protein and the second peak representing cysteine. Fractions corresponding to protein were combined and made up to 100 cm.$^3$ in 0.05 M phosphate buffer pH 7.6 (this solution was called Trypsin SH IV). (The copolymer which had been washed with cysteine hydrochloride was called Free Solid.)

A calibration curve for protein was constracted using standard solutions of trypsin containing 50, 100, 150, 200 and 250 μg/cm.$^3$. Trypsin SH II (1.0 cm.$^3$), Trypsin SH III (1.0 cm.$^3$) and Trypsin SH IV (1.9 cm.$^3$) assayed in the same way. The data are presented in Table 2. The amount of protein which had coupled with Copolymer B (50 mg.) was calculated as 5.0 mg.

TABLE 2

Determination of the Protein in Trypsin SH I and the Amount which coupled to Copolymer B

| Sample: | O.D. 500 nm. |
|---|---|
| Tryspin 50 μg./ 1 cm.$^3$ | 0.112 |
| Tryspin 100 μg./ 1 cm.$^3$ | 0.195 |
| Tryspin 150 μg./ 1 cm.$^3$ | 0.305 |
| Tryspin 200 μg./ 1 cm.$^3$ | 0.375 |
| Tryspin 250 μg./ 1 cm.$^3$ | 0.465 |
| Tryspin SH II | 0.115 |
| Tryspin SH III | 0.340 |
| Tryspin SH IV | [1] 0.110 |
| Blank | 0.042 |

[1] Represents 50 mg. of trypsin attached to 50 mg. of copolymer.

EXAMPLE 5

3. Copolymer B-Trypsin as a solid phase Enzyme.—Copolymer B was treated with Trypsin SH I in the presence of cross-linking solution exactly as before, using the same scale. After washing with the buffer (7×3 cm.³), the solid was then suspended in 0.05 phosphate Buffer pH 7.6 (3 cm.³) and transferred carefully to a test tube and the volume diluted to 5.0 cm.³ with the same buffer. Casein (10 mg. in 5.0 cm.³ of 0.05 M phosphate buffer pH 7.6) was added to the stirred suspension which was then incubated at 37° C. for 15 minutes. Trichloroacetic acid solution (2 cm.³ 5.0% w./v.) was added to terminate reaction. The suspension was centrifuged and 5.0 cm.³ of the supernatant was made up to 10.0 cm.³ with 0.05M phosphate buffer pH 7.6 and the optical density was read at 280 nm. The same procedures were repeated with Trypsin SH I (2.5 cm.³ diluted to 5 cm.³).

The following control solutions were prepared:

i. Trypsin (10 mg.) in carbonate buffer pH 10.6 (10 cm.³);
ii. Trypsin (10 mg.) in carbonate buffer pH 10.6 (1.0 cm.³) was applied to a column of Sephadex G 25 (1×6 cm.). The protein was collected as before and the fractions were made up to 10 cm.³ of carbonate buffer pH 10.6;
iii. Trypsin (10 mg.) in 0.05 M phosphate buffer pH 7.6 (10.0 cm.³) 1.0 cm.³ of each buffer was diluted to 5.0 cm.³ and assayed in the same way with casein. A blank solution of phosphate buffer pH 7.6 (5.0 cm.³) was assayed in the same way (Table 3).

test-tube and the volume made up to 2.5 cm.³ with 0.05 M phosphate buffer pH 8.0 BAEE (35.6 mg./100 cm.³ of 0.05 M phosphate buffer pH 8.0 1.0 cm.³) was added to the stirred suspension which was incubated at 37° C. for 30 minutes. Then it was cooled rapidly to 0° C. in an ice bath. The suspension was centrifuged and 1 cm.³ of the supernatant was diluted to 10 cm.³ with 0.05 M phosphate buffer pH 8.0 and the optical density was read at 253 nm.

The following control solutions were prepared:

i. Trypsin (10 mg.) in carbonate buffer pH 10.6 (10 cm.³);
ii. Trypsin (10 mg.) in carbonate buffer pH 10.6 (1.0 cm.³) was applied to a column of Sephadex G 25 (1×6 cm.). The protein was collected as before and the fractions were made up to 10 cm.³ of carbonate buffer pH 10.6.
iii. Trypsin (10 mg.) in 0.05 M phosphate buffer pH 8.0 (10 cm.³). A solution of 1.0 cm.³ of each control was diluted to 2.5 cm.³ and assayed in the same way with BAEE. Also 2.5 cm.³ of each of the following solutions were assayed in the same way; Trypsin SH I, Trypsin SH'III and a blank solution of 0.05 M phosphate buffer pH 8.0 (see Table 4).

TABLE 4

Enzymic Activity of Solid-Phase Trypsin, prepared by the Thiol Oxidation Method, using BAEE as Substrate

| Sample | Enzymic activity (O.D. 280 nm.) | O.D. after subtracting the blank | Amount of protein (mg.) | Activity per mg. protein | Percent activity relative to control iii |
|---|---|---|---|---|---|
| Solid phase trypsin (50 mg.) | 0.184 | 0.121 | 5.0 | 0.024 | 6.6 |
| Trypsin SH I | 0.367 | 0.304 | 2.6 | 0.117 | 32 |
| Trypsin SH' III | 0.069 | 0.006 | 0.425 | 0.011 | 3 |
| Control: | | | | | |
| I | 0.442 | 0.379 | 1.0 | 0.379 | 105 |
| II | 0.372 | 0.309 | 1.0 | 0.309 | 81 |
| III | 0.424 | 0.361 | 1.0 | 0.361 | 100 |
| Blank | 0.063 | | | | |

EXAMPLE 6

Enzymic Activity for the Regenerated Trypsin SH (Trypsin SH IV) and the Free solid The free solid was transferred carefully to a test tube and suspended in phosphate buffer pH 8.0 (0.05 M, 5 cm.³). 5 cm.³ of BAEE (35.6 mg./100 cm.³) was then

TABLE 3

Enzymic Activity of Solid-phase Trypsin, prepared by the Thiol Oxidation Method, using Casein as Substrate

| Sample | Enzymic activity (O.D. 280 nm.) | O.D. after subtracting the blank | Amount of protein (mg.) | Activity per mg. protein | Percent activity relative to control iii |
|---|---|---|---|---|---|
| Solid phase trypsin (50 mg.) | 0.278 | 0.175 | 5.0 | 0.035 | 5.8 |
| Trypsin SH I | 0.419 | 0.316 | 2.6 | 0.121 | 20 |
| Control: | | | | | |
| i | 0.549 | 0.446 | 1.0 | 0.446 | 74 |
| ii | 0.498 | 0.395 | 1.0 | 0.395 | 66 |
| iii | 0.698 | 0.595 | 1.0 | 0.595 | 100 |
| Blank | 0.103 | | | | |

The reaction of Trypsin SH I with Copolymer B was repeated as before using the same scale. The solid was centrifuged down and washed with carbonate buffer pH 10.6 (7×3 cm.³). The supernatants and the washing were combined and made up to 100 cm.³ as before (SH¹ III). The solid was suspended in 0.05 M phosphate buffer pH 8.0 (1.0 cm.³).

Enzymic Activity Using a Small Substrate (Benzoylarginine Ethyl Ester (BAEE))

The solid phase enzyme was transferred carefully to a added to the stirred suspension which was incubated at 37° C. for 30 minutes. Then it was cooled to 0° C. in an ice bath. The suspension was centrifuged and 1.0 cm.³ of the supernatant was diluted to 10 cm.³ with phosphate buffer. The optical density of this solution was read at 253 nm. The same experiment was repeated with a control solution of trypsin (5 mg./100 cm.³) on the same buffer (5.0 cm.³) with Trypsin SH IV (5.0 cm.³) and with a blank solution of phosphate buffer (Table 5).

TABLE 5

Enzymic Activities of Free Copolymer and Wash Solution related to Solid-Phase Trypsin prepared by the Thiol-Oxidation Method

| Example | Enzymic activity (O.D. 253 nm.) | O.D. after subtracting the blank | Amount of protein (mg.) | Activity per mg. protein | Percent activity relative to control |
|---|---|---|---|---|---|
| Trypsin SH IV | 0.139 | 0.047 | 0.250 | 0.184 | 21 |
| Control | 0.308 | 0.216 | 0.250 | 0.864 | 100 |
| The Free solid | 0.094 | 0.002 | | | |
| Blank | 0.092 | | | | |

EXAMPLE 7

Preparation of a Water Insoluble Hydrophilic Polythiol (Copolymer B)

N-Acrylcylthiazolidine - 4 - Carboxylic Acid.—A Acrylcyl chloride (3.0 cm.$^3$) was added dropwise to a stirred, cooled solution of thiazolidine-4-carboxylic acid (4.6 g.) and sodium carbonate (7.2 g.) in water (64 cm.$^3$). The reaction mixture was stirred at 4° C. for 6 hours, after which time it was acidified with cooled 1N hydrochloric acid. The acidified solution was then extracted with ethyl acetate. The ethyl acetate layers were washed with water (3×50 cm.$^3$), dried (Na$_2$SO$_4$) and evaporated leaving a liquid which crystallized on being treated with dry ethyl acetate. The crystalline product was collected, dried in a desiccator over P$_2$O$_5$. Yield (4.2 g.), m.p. 219–221° C. [α]$_D^{23}$ −1660° (C=1.0, 1 N NaOH). T.L.C. ninhydrin negative, chlorine positive spot RF 0.23 (solvent B), RF 0.75 (ethyl acetate). The infrared spectrum showed bands at 1750, 1630, 1240 and 720 cm.$^{-1}$.

Analysis.—Found: C, 45.3; H, 4.9; N, 6.9; S, 17.7. C$_7$H$_9$NO$_3$S requires: C, 44.9; H, 4.8; N, 7.5; S, 17.1.

Copolymer of Acrylamide and N-Acryloylthiazolidine-carboxylic Acid (Copolymer F)

Copolymer F was prepared in the same way as Copolymer A, using N-acryloylthiazolidinecarboxylic acid (1.0 g.), N,N'-methylenebisacrylamide (300 mg.), Solution A (4 cm.$^3$) and Solution B (cm.$^3$). The copolymer was a white powder. Yield (2.14 g.). The infrared spectrum (KBr) showed bands at 3200, 3400, 2995, 1640–1680, 1450 and 1120 cm.$^{-1}$.

Conversion of Copolymer F to Copolymer B'

A suspension of Copolymer F (200 mg.) in 1N hydrochloric acid (10 cm.$^3$) was heated to 70° for 3 hours, after which time it was cooled to room temperature. The solid was filtered off, washed with oxygen-free water (100 cm.$^3$), cysteine hydrochloride solution (0.1M in oxygen-free water 100 cm.$^3$), oxygen-free water (100 cm.$^3$) and then with ethanol (200 cm.$^3$). The copolymer was dried in a desiccator over P$_2$O$_5$. The product was a white powder (160 mg.). The infrared spectrum (KBr) showed bands at 3430, 3200, 1640–1730 and 2580 cm.$^{-1}$.

EXAMPLE 8

Conversion of Copolymer B to the Corresponding Thiolactone (Copolymer C)

Dicyclohexylcarbodiimide (85 mg.) was added to a stirred suspension of Copolymer B (400 mg.) in dioxane (dry, peroxide-free, 10 cm.$^3$). The reaction mixture was stirred overnight at room temperature. The solid was filtered off and washed thoroughly with dimethylformamide (200 cm.$^3$) and then with peroxide-free ether (100 cm.$^3$). It was then dried in a desiccator over P$_2$O$_5$. Yield (340 mg.). The infrared spectrum (KBr) showed bands at 3400, 3200, 2920 and 1680 cm.$^{-1}$ so indicating that the polymer contained thiolactone groups.

EXAMPLE 9

The Reaction of β-Glucosidase With Copolymer C

β-Glucosidase (2.0 mg. in buffer 2.0 cm.$^3$) was added to a stirred suspension of Copolymer C (40 mg.) in 0.1 M phosphate buffer pH 6.0 (5 cm.$^3$). The suspension was stirred at 0° C. for 5 hours and was then centrifuged and the supernatant discarded. The solid was then washed alternately with 0.2 M acetate buffer pH 5.0 and 0.2 M acetate buffer pH 5.0+1 M sucrose+1 M sodium chloride (3× 5 cm.$^3$ each). The solid was then suspended in 0.2 M acetate buffer pH 5.0 (3 cm.$^3$). The solid was transferred carefully to a test tube and the volume made up to 5 cm.$^3$ with the same buffer. o-Nitrophenyl-β-D-glucopyranoside (0.2 mg. in 1.0 cm.$^3$) was added to the suspension which was stirred at 37° C. After 5 minutes, an aliquot of 0.5 cm.$^3$ was removed and added to 0.2 M sodium carbonate (0.5 cm.$^3$). A yellow colour developed. The O.D. of the supernatant after centrifugation was read at 420 nm. Coupling of β-glucosidase with Copolymer C at different pH values (7.0, 8.0, and 9.0) was repeated in the same way and the activities of the resulting solid phase enzymes determined. A standard solution of β-glucosidase (0.2 mg. in 5 cm.$^3$ of water) and a control of acetate buffer pH 5.0 (5 cm.$^3$) were incubated with O-nitrophenyl-β-D-glucopyranoside and treated in the same way. (Table 6).

TABLE 6

ENZYMIC ACTIVITY PER MG. OF β-GLUCOSIDASE ATTACHED TO COPOLYMER (Thiolactone method)

| pH of coupling process | Enzymic activity (O.D. 420 nm.) | O.D. after subtracting the blank | Amount of protein (mg.) | Activity per mg. protein | Percent activity relative to the control |
|---|---|---|---|---|---|
| 6.0 | 1.104 | 1.048 | 0.643 | 1.62 | 21.7 |
| 7.0 | 0.439 | 0.383 | 0.253 | 1.51 | 20.8 |
| 8.0 | 0.159 | 0.103 | 0.140 | 0.735 | 11.3 |
| 9.0 | 0.105 | 0.049 | 0.123 | 0.398 | 5.4 |
| Control | 1.505 | 1.449 | 0.200 | 7.254 | 100 |
| Blank | 0.054 | | | | |

Similar results were achieved with trypsin (Table 7).

TABLE 7

Enzymic Activity of Solid-phase Trypsin prepared by Coupling of Trypsin with Copolymer Thiolactone.

| pH at which coupling took place: | O.D. 280 nm. in enzyme assay |
|---|---|
| 6.0 | 1.290 |
| 7.0 | 0.810 |
| 8.0 | 0.751 |
| 9.0 | 0.535 |
| Control | 1.161 |
| (0.2 mg. of trypsin) | |
| Blank | 0.231 |

EXAMPLE 10

Preparation of a Water-Insoluble Tydrophilic Poly Thiol (Copolymer H)

Preparation of Acetamidomethanol

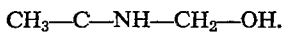
$CH_3$—C—NH—$CH_2$—OH.

Acetamide (10 g.) was dissolved in a solution of sodium hydroxide (1 g.) in 40% fomaldehyde (12.5 ml.). The solution was warmed briefly on a water bach (3 mins.) and then left overnight at room temperature.

Solid carbon dioxide was added to the solution to adjust it to pH 8.0. It was then rotary evaporated not exceeding 40° C., to yield a colourless syrup. The syrup was taken up in dry acetone and a little anhydrous sodium sulphate was added to remove any remaining water. The solution was filtered and the clear filtrate was again treated with anhydrous sodium sulphate and filtered as before. When left at room temperature overnight the syrup (after removal of acetone by rotary evaporation) formed a white crystalline solid which was hygroscopic. The solid was stored in a vacuum dessicator over $P_2O_5$ overnight.

Yield=11.6202 g.

T.L.C. (solvent A)—

Ninhydrin (weak+ve).

Tetrazolium (negative) Single spot.

R.F. 0.652

Preparation of S-Acetamidomethyl-L-cysteine hydrochloride.—

$CH_2$—S—$CH_2$—NH—$OCOCH_3$ $NH_c{}^+$—CH—$CO_2H$ $CL^-$

L-cystein hydrochloride monohydrate (9.87 g.) was dissolved in 0.32 M hydrochloric acid (20 mil) i.e. pH 0.5 at 26° C. Acetamidomethanol (5 g.) was added to this solution and stirred at 25° C. until the reaction was completed (4 days). The reaction mixture was rotary evaporated at 35° C., leaving a colourless syrup which crystallised at room temperature after very slightly scratching the glass. The solid was re-crystallised by refluxing with methanol/ether and then adding excess ether to the solvent mixture, thus causing the product to precipitate. The crystalline white solid was dried with $P_2O_5$, in a vacuum dessicator overnight. Yield=9.9456 g. T.L.C. (Solvent A) ninhydrin+ve. RF (0.091), M. Pt. 149–151° C.

Preparation of N-Acryloyl - S - Acetamidomethyl-cysteine-hydrochloride.—Acryloyl chloride (3.5 ml.) was added in 250 ml. aliquots to an ice-cooled, stirred solution of S-acetamidomethyl-cysteine hydrochloride (4.5 g.) in 1N. sodium hydroxide (70 ml.). The initial pH of the reaction mixture was pH 11.0. After each addition of acryloyl chloride the pH was measured. A further volume of alkali had to be added to maintain a pH of not less than 9.0 i.e. 50 ml. 1N. sodium hydroxide. During addition of the acryloyl chloride the solution changed from colourless to a pale straw colour.

After stirring at 0° C., for 1½ hours there was no starting material left in the reaction mixture (i.e. ninhydrin —ye). The solution was adjusted to pH 2.0 by slow addition, with rapid stirring, of ice-cold 1N. hydrochloric acid.

It was then extracted with ethyl acetate and the aqueous layers rotary evaporated to give an oil.

A small quantity of anhydrous sodium sulphate was added to absorb any remaining water. This resulted in a deep yellow syrup containing both sodium chloride and sodium sulphate. Methanol was added and the solution containing largely undissolved salts was filtered. This process was repeated until the majority of salts had been removed. After treatment with a little dichloromethane and methanol the syrup crystallised forming a cream "egg-shell like" solid.

Yield=3.5 gms. methanol soluble.

T.L.C. (solvent B) Ninhydrin-ve, iodine+ve.

RF=0.567

(solvent A) Ninhydrin-ve, iodine+ve.

RF=0.393

Preparation of Co-Polymer of N-Acryloyl-S-Acetamidomethyl Cysteine Hydrochloride Solution A and B were prepared as follows:

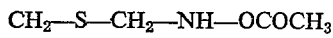

Solution A:
  Tris buffer_____ 36.6 g_____ ⎫
  T.E.M.E.D____ 0.46 mils__ ⎬ Diluted to 100 with water.
  1N. HC_____ 48 g_____ ⎭
Solution B:
  Acrylamide_____ 28 g_____ ⎫ Mixed and made up to 100 mils with
  Bisacrylamide__ 0.735 g____ ⎭ water.

1 g. of Acryloyl-S-acetamidemethyl cysteine hydrochloride was dissolved in solution A (4 ml.) whilst bis-acrylamide (300 mg.) was dissolved in solution B (1 mil.). These two solutions were rapidly mixed and 0.14% (w./v.) ammonium persulphate (16 ml.) was added. The gel formed after 10 to 15 mins. at room temperature.

After leaving overnight, the polymer was broken up and macerated with an homogeniser, using water (200 ml.). The suspension was then centrifuged at 3,000 r.p.m. for $f$ mins. and the supernatant removed. The polymer was repeatedly washed with water (4×200 mls.) and then ethanol (4×200 mls.) thus producing a fine white powder which was dried with $P_2O_5$ in a vacuum desiccator.

Yield 3.5908 gms.

Treatment of the Copolymer With Mercury

Copolymer (100 mg.) obtained above was suspended in a stirred solution of mercuric acetate (150 mg.) in water 10 ml.), for 30 minutes at room temperature.

(a) The majority of excess mercuric acetate was then removed by washing repeatedly with water (6×10 ml.) centrifuging, and removing the supernatant.

(b) The copolymer was then repeatedly washed with cysteine-hydrochloride solution (approx. 100 mg./ml. pH 3.0) (6 to 8×10 mls.). The copolymer was then repeatedly washed with water until the supernatant gave a negative response to the cysteine assay, and the copolymer was then tested for thiol groups.

Test for Cysteine —SH in samples of copolymer:

(a) copolymer treated with potassium iodide and then cysteine hydrochloride (method 1)

(b) copolymer treated only with cysteine hydrochloride (method 2).

Accurate weights of approximately 1 mg. of each copolymer were suspended in water (1 ml.). Standard solutions of L-cysteine hydrochloride in water ranging from 100 to 208 ml. and a blank solution were also prepared. To each was added 0.1M tris buffer, pH 8.0 (4 ml.). After mixing each co-polymer suspension, dithio-bis-(2-nitrobenzoic acid) (2 mg./ml., in 0.1M phosphate buffer, pH 7.0 to 0.1 ml. was added to each sample and to the standards. After leaving at room temperature for 10 minutes the O.D. at 412 nm. was read against water. Each copolymer suspension was centrifuged and a reading taken from the supernatant.

Results:

| Sample | O.D. 412 nm. | Cysteine/mg. |
|---|---|---|
| Cells | 0.002 | |
| Blank | 0.044 | |
| 208/ml | 0.350 | |
| 408/ml | 0.655 | |
| 608/ml | 0.955 | |
| 808/ml | 1.260 | |
| 1,008/ml | 1.570 | |
| Copolymer a (0.90 mg.) | 0.624 | 38.58 i.e. 42.77/mg. |
| Copolymer b (1.10 mg.) | 0.748 | 46.58 i.e. 42.409/mg. |

Thus the copolymer (a) treated with iodide and cysteine has a thiol content of 4.277% and the copolymer (b) treated only with cysteine has a thiol content of 4.241%.

Test for Mercury

Both iodine and cysteine interfered with this test and therefore both were removed before the test was applied.

(a) 1 ml. of the sample was taken.
(b) 2 drops of p-dimethylaminobenzalrhodamine (0.03% in acetone)
(c) 2 drops of saturated sodium acetate solution were added.

A pink colour indicated that the test was positive.
A yellow colour indicated that the test was negative.

Test for Iodide (a) 1 ml. of sample was acidified with one drop of dilute hydrochloric acid.
(b) 1 drop of dilute $H_2O_2$ was added.
(c) 1 drop 1% aqueous starch solution were added. 10 minutes were allowed for the colour to develop—slow for weak solutions.

+ve indicated by blue
−ve indicated by no colour

Test for Cysteine—Qualitative

Reagent: Approx. 2 mg./ml. D.T.B. in 0.1M, phosphate buffer pH 7.8.

(a) 1 ml. of the sample was used.
(b) 1 drop of D.T.B. reagent was added.

+ve indicated by yellow
−ve indicated by colourless

Solvent A—T.L.C.: Vols.
  Pyridine _____ 5.0
  Acetic acid _____ 2.5
  n-Butanol _____ 17.5
  Water _____ 25.0
Solvent B—T.L.C.:
  Butanol _____ 4
  Acetic acid _____ 1
  Water _____ 5

Tetrazolium spray.—For detecting the sulphhydryl group of cysteine.

(1) A plate was sprayed with 30% (w./v.) sodium carbonate.
(2) The plate was sprayed with solution of 2,3,5-triphenyltetrazolium chloride in chloroform (0.5% w./v.).

+ve indicated by a red spot.

As can be seen from these Examples the water-insoluble hydrophilic thiol and thiolactone copolymers according to the invention are useful in supporting biologically active molecules such as enzymes in an insoluble state while leaving the active molecules free to for example catalyse reactions.

The Examples also illustrate the use of the copolymers according to the invention as the fill of chromatographic columns, and where these columns contain copolymer B or B′ are particularly useful in the isolation of biologically active molecules containing disulphide groups such as antibodies, insulin and lipoic acid and their separation from other organic compounds that do not contain these groups. The same polymers B and B′ can be used for the disproportionation of other active molecules containing disulphide groups such as cysteine.

What we claim is:

1. In a hydrophilic water-insoluble polymer having attached thereto biologically-active molecules along its molecular chains the improvement which comprises repeating disulphide, thiol or thiolactone side groupings on said molecular chain wherein the biologically-active molecules are reacted with said side groupings to attach said biologically-active molecules to the polymer, said improved polymer characterized by being regenerable or readily activated.

2. The polymer of Claim 1 wherein the biologically-active molecules are selected from the group consisting of enzyme molecules and enzyme derivatives.

3. The polymer of Claim 2 wherein the polymer contains functional side groupings which make the polymer hydrophilic.

4. The polymer of Claim 3 wherein the functional side groupings which make the polymer hydrophilic include primary amide groups.

5. The polymer of Claim 4 wherein the said functional side groupings include carboxylic acid groups.

6. In a hydrophilic water-insoluble polymer to which biologically-active molecules can be attached to the molecular chains of said polymer, the improvement which comprises repeating thiol, disulphide or thiolactone side groupings on said molecular chains to which the biologically-active molecules can be attached to give a combined regenerable or readily activated water-insoluble polymer and biologically-active molecule, the molecular chains also having other repeating functional side groups which make the polymer hydrophilic, the said other repeating functional side groupings including primary amide groups.

7. The polymer of Claim 6 wherein the said biologically-active molecules are enzyme molecules.

8. The polymer of Claim 7 wherein the said other repeating functional side groupings additionally include carboxylic acid groups.

9. The water-insoluble hydrophilic polymer according to Claim 6 to which has been attached biologically-active molecules.

10. The water-insoluble hydrophilic polymer according to Claim 9 to which has been attached enzyme molecules.

11. The water-insoluble polymer according to Claim 10 wherein the enzyme is trypsin.

12. An inert porous support having impregnated in the pores an improved hydrophilic water-insoluble polymer to which biologically-active molecules can be attached to the molecular chains of said polymer, the improvement in said polymer comprising repeating thiol, disulphide or thiolactone said groupings on said molecular chains to which the biologically-active molecules can be attached to give a combined regenerable or readily activated water-insoluble polymer and biologically-active molecule, the molecular chains also having other repeating functional side groups which make the polymer hydrophilic, the said other repeating functional side groupings including primary amide groups.

13. A chromatographic column, the fill of which is an improved hydrophilic water-insoluble polymer to which biologically-active molecules can be attached to the molecular chains of said polymer, the improvement in said polymer comprising repeating thiol, disulphide or thiolactone side groupings on said molecular chains to which the biologically-active molecules can be attached to give a combined regenerable or readily activated water-insoluble polymer and biologically-active molecule, the molecular chains also having other repeating functional side groups which make the polymer hydrophilic, the said other repeating functional side groupings including primary amide groups.

References Cited
UNITED STATES PATENTS

| | | | |
|---|---|---|---|
| 3,666,733 | 5/1972 | Epton | 195—63 X |
| 3,674,767 | 7/1972 | Lilly et al. | 195—63 X |
| 3,577,266 | 5/1971 | Kirkland | 210—198 C |

JOHN ADEE, Primary Examiner

U.S. Cl. X.R.

55—386; 195—63, DIG. 11